United States Patent [19]
Salesky et al.

[11] Patent Number: 5,478,048
[45] Date of Patent: Dec. 26, 1995

[54] NON-PLANAR FLEXIBLE GRAPHITE SEALING RINGS

[75] Inventors: William J. Salesky, Irvine; Harold A. Lacquement, Bellflower; John E. Bridges, Phillips Ranch, all of Calif.

[73] Assignee: Mark Controls Corporation, Long Beach, Calif.

[21] Appl. No.: 258,192

[22] Filed: Jun. 10, 1994

Related U.S. Application Data

[63] Continuation-in-part of Ser. No. 806,593, Dec. 12, 1991, Pat. No. 5,201,532.

[51] Int. Cl.⁶ .................................................. F16J 15/00
[52] U.S. Cl. ...................... 251/214; 273/124; 273/188 R
[58] Field of Search .............................. 277/104, 105, 277/124, 125, 123, 188 R; 251/214

[56] References Cited

U.S. PATENT DOCUMENTS

| | | | |
|---|---|---|---|
| 2,684,262 | 7/1954 | Neesen | 277/124 |
| 2,706,655 | 4/1955 | Showalter | 277/124 |
| 3,069,178 | 12/1962 | Rosen | 277/112 |
| 3,467,394 | 9/1969 | Bryant | 277/125 |
| 3,554,563 | 1/1971 | Schumacher | 277/124 |
| 4,576,385 | 3/1986 | Ungchusri et al. | 277/124 |
| 4,886,241 | 12/1989 | Davis et al. | 277/105 |
| 5,129,625 | 7/1992 | Wood et al. | 277/124 |

*Primary Examiner*—Daniel G. DePumpo
*Attorney, Agent, or Firm*—Christie, Parker & Hale

[57] ABSTRACT

A non-planar flexible graphite sealing ring is used to control leakage in a fluid handling device where a shaft extends through the wall of the device. The flexible graphite sealing ring comprises a chevron-shaped cross section having approximately complementary inner and outer end faces that are made by laminating sheets of flexible graphite foil in layers transverse to the ring's axis. A plurality of flexible graphite rings are inserted over the shaft and into the stuffing box, occupying the space between the shaft and the stuffing box. The flexible graphite sealing rings are oriented so that each ring's inner end face adjoins the outer end face of another ring. Upon application of a compressive force the interaction between the dissimilar end faces causes an enhanced interference fit between the shaft and the stuffing box forming a seal. An asymmetrical chevron cross section of a sealing ring, and W- and V-shaped end rings are used in additional embodiments.

19 Claims, 4 Drawing Sheets

NON-PLANAR FLEXIBLE GRAPHITE SEALING RINGS

This application is a continuation-in-part of U.S. patent application Ser. No. 07/806,593, filed Dec. 12, 1991, now U.S. Pat. No. 5,201,532 and a national stage application with International application PCT/US92/10748 filed Dec. 11, 1992.

BACKGROUND

This invention relates to a non-planar flexible graphite sealing ring used to minimize fluid leakage in a valve stuffing box that occurs between the valve stem and the stuffing box housing.

In a fluid handling device, such as a pump or a valve, where a moving stem or shaft extends through a wall of the device, a seal is required at that point to prevent the fluid from leaking from the device. Leakage from such fluid handling devices is undesirable for obvious health, air quality, and safety reasons. For example, a leak of a toxic or flammable fluid could pose a direct threat to human life. Today's heightened environmental consciousness is another influential driving force behind minimizing leaks of toxic or other potentially harmful liquids or gasses onto the ground or into the atmosphere.

Accordingly, such fluid handling devices are often sealed by placing a formed packing material around the shaft, and containing the packing material in the compressed state in a stuffing box. Ideally, the packing material selected should be resilient such that it deforms under compression to conform to the interior of the stuffing box and forms a tight interference seal against the shaft. The packing material should also present a low friction surface to the moving shaft and be stable under the environmental conditions to which it may be exposed. It is also desirable that the packing material act to keep the shaft clean and clear of debris by wiping the surfaces of the shaft as the shaft is passed through the stuffing box. Preferably, the packing is a self energized seal, i.e. that it seals by application of pressure on the seal. It is also desirable that the packing material itself be resistant to fire since many applications are for petrochemical service where fire may be a concern.

Flexible graphite is known in the art and has long been employed as a packing material to form seals for the stuffing box assembly of pumps, valves and like fluid handling devices. Flexible graphite refers to graphite which has been exfoliated and recompressed to a coherent body. The advantage of using graphite as a packing material lies in its excellent thermal stability and chemical resistance. Graphite is also a low friction composition that has commonly been used as a lubricant in certain applications. However, as practiced in the art, flexible graphite has not always proven to be an adequate sealing material due to the lack of resiliency inherent in the particular form used.

One such form of flexible graphite is that of a preshaped ring made by compressing in a closed die a ribbon or tape of flexible graphite that has been wrapped circumferentially in several layers around a shaft. This spiral wrapped form of flexible graphite comprises an anisotropic structure having its bonding planes oriented parallel to the shaft axis. Such flat rings may also be made by laminating exfoliated graphite particles or sheets in a flat sheet and cutting flat gaskets from such a sheet.

The rings are used by stacking several rings over the stem of the fluid handling device such that the rings occupy the annular space between the shaft and the stuffing box housing. A metal collar is then inserted over the stem and is tightened to compress the flexible graphite rings so that the rings deform laterally. An interference fit is formed against the shaft and the interior wall by applying a compressive force to the top of the ring stack.

A shortcoming of this form of flexible graphite lies in its limited resiliency when subjected to an axial compression force. The ends of the ring are flat and they spread laterally only a small amount in response to compression. This lateral spreading is controlled by Poisson's ratio for the material. High compressive forces are required to maintain a good seal. In addition, only the rings near where the force is applied seal due to poor transfer of load between the rings. In one type of valve, a compressive force of about 400 kg/cm$^2$ (5600 psi) may be required to get an interference fit. Even so, traces of leakage may be detected immediately or after limited use.

Flexible graphite seals made from exfoliated graphite have also included braided graphite yarns. Such seals are typically made by wrapping the braided graphite around a shaft. Individual rings may be formed by cutting a helix of braided graphite.

A somewhat self energizing seal is made with a stack of rings, each of which has a wedge shaped transverse cross section. Alternating rings have greater thickness at the inside diameter and outside diameter, respectively. Longitudinal compression on a stack of such rings in a seal tends to wedge alternating rings inwardly and outwardly for sealing against the shaft and stuffing box, respectively.

A self energizing seal which is better than a flat ring has been made of materials such as polytetrafluoroethylene (referred to by the trademark, Teflon). In cross section each side of the ring has a chevron shape. The angles of the chevron are different on the opposite end faces of the ring. When the rings are compressed, the concave side of the chevron is spread laterally by the convex side of an adjacent ring and the edges of the chevron tightly engage the shaft and stuffing box, forming a tight seal. Teflon forms a good seal, but has temperature limitations and cannot be used above about 260° C.

It would be desirable to form graphite chevron seals, but they have never been made satisfactorily. When such seal rings are formed from circumferentially wound flexible graphite, the planes of weakness extend in the direction of the shaft axis and the rings break apart during the forming operation or when stressed during use.

It is, therefore, highly desirable to provide a flexible graphite packing ring that is sufficiently resilient to allow the degree of deformation necessary to provide a tight interference fit under compression and be strong enough to resist compressive forces. It is also desirable that the flexible graphite packing material be both simple to install and operate.

BRIEF SUMMARY OF THE INVENTION

There is, therefore, provided in practice of this invention according to a presently preferred embodiment, a non-planar flexible graphite sealing ring capable of sealing a shaft that extends beyond the wall of a fluid handling device and is contained in a stuffing box housing. The sealing ring comprises a non-planer configuration having approximately complementary top and bottom end faces. The cooperation of these end faces, when stacked end-to-end and subjected to a compressive force, causes each ring to expand and force itself against both the shaft and interior wall of the stuffing box.

The non-planar flexible graphite sealing ring has planes of lamination bonding transverse to the shaft axis and the applied compressive force. The flexible graphite sealing ring is made from exfoliated graphite by compressing the exfoliated graphite particles into sheets of foil, stacking the foil, and then laminating the flexible graphite foil stacks by applying a compression force transverse to the planes of the foil sheets. The flexible graphite sealing ring produced in this manner is better able to accommodate the degree of lateral deformation, under compression, inherent in the non-planar configuration of the ring and provide the interference fit needed to form an adequate seal.

DETAILED DESCRIPTION

Figure 1:
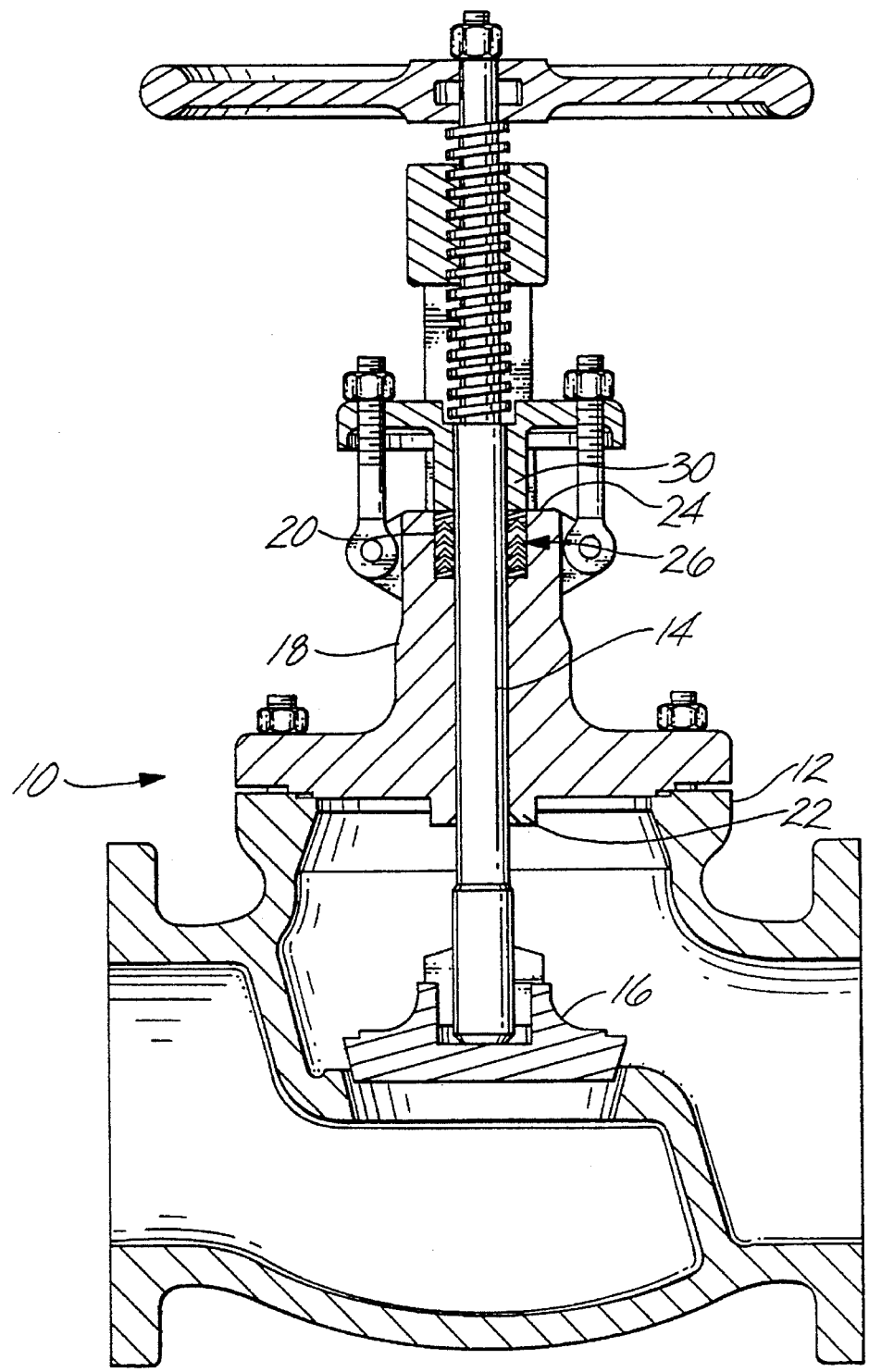
FIG. 1 is a cross section of a valve and non-planar flexible graphite sealing rings provided in practice of this invention.

In an exemplary embodiment the flexible graphite packing of the present invention is used to minimize leakage in fluid handling devices caused by the insertion of a shaft through the wall of the device and into the fluid. An exemplary fluid handling device is a globe valve 10 as illustrated in FIG. 1. The valve comprises a body 12 having a fluid passage through which the liquid or gas can flow. A shaft or stem 14 extends from outside into the body and is attached to a plug 16 within the valve body which selectively opens or closes the fluid passage through the valve. The shaft exits the body by passing through a bonnet 18 comprising a stuffing box 20.

Figure 2:
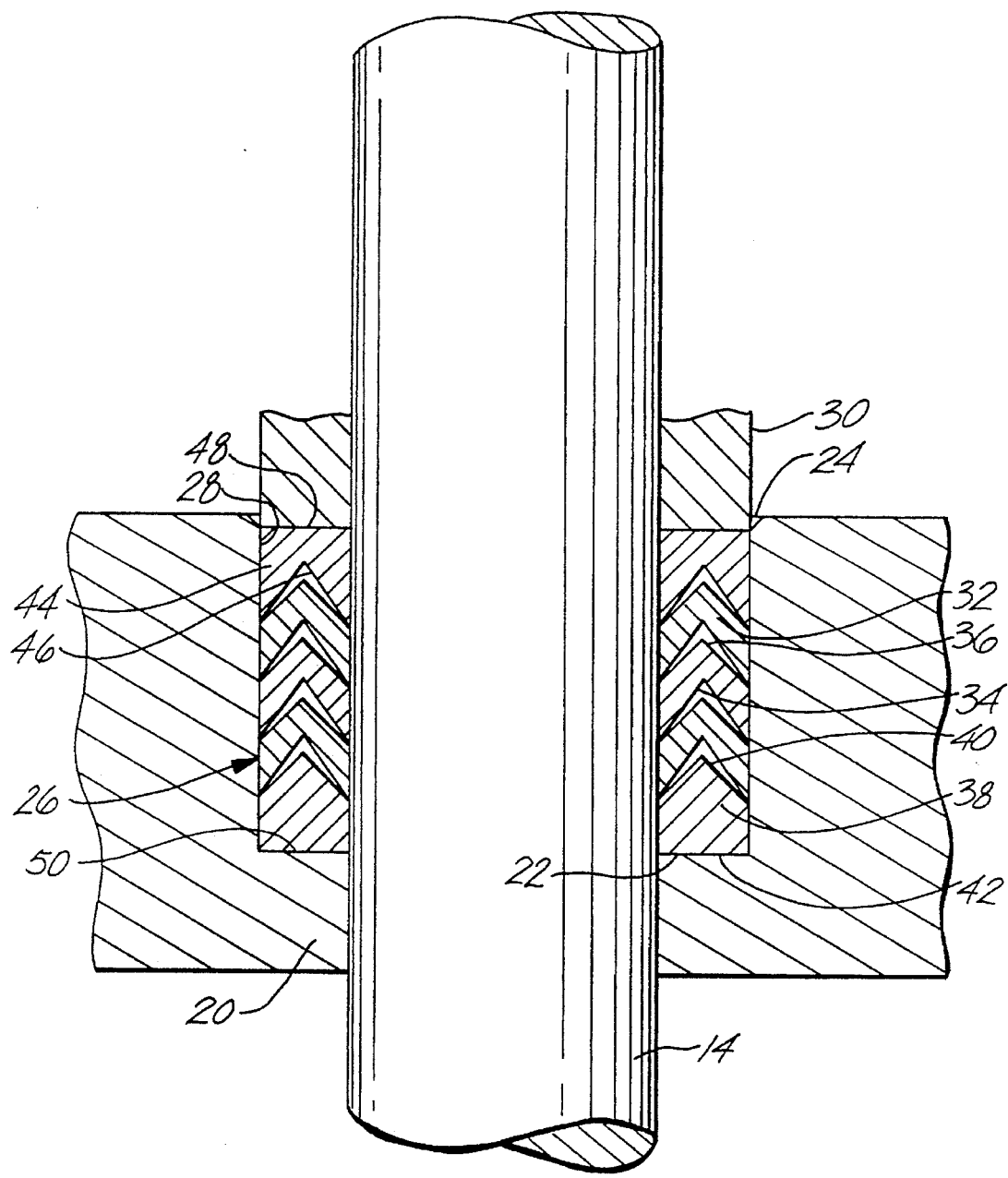
FIG. 2 is an enlarged cross section of the stuffing box housing, the shaft and the non-planar flexible graphite sealing rings.

The stuffing box comprises a cylindrical housing having a narrowed inner end 22 near the body and an open outer end 24 nearer the outer surface (FIG. 2). A plurality of flexible graphite packing or sealing rings 26 fit around the shaft and reside between the shaft and the interior wall 28 of the stuffing box. A packing gland 30 fits on top of the flexible graphite packing rings and serves to apply a compressive force to the packing rings when tightened to the bonnet.

In such a valve the liquid or gas flow being controlled is generally at a pressure significantly greater than atmospheric pressure. Accordingly, since the shaft passes from the body to the atmosphere, leakage occurs at that point where the shaft enters the bonnet. The leakage is controlled though an interference fit achieved by applying a compressive force to the non-planar flexible graphite packing rings contained in the stuffing box.

The illustrated valve is conventional and merely exemplary of a variety of valves in which the novel sealing rings may be employed. Thus, the packing is equally applicable to gate valves, butterfly valves, control valves, or other rising stem or quarter turn valves where a shaft seal is required. Such a packing may also be used in the more dynamic seals of a pump or other rotating machinery or in hydraulic or pneumatic actuators. It is particularly useful for high temperature applications or in the presence of corrosive materials.

In an exemplary embodiment, a flexible graphite packing material used in controlling leakage in fluid handling devices comprises a plurality of non-planar flexible graphite pressure sealing rings 32 having a chevron-shaped cross section with approximately complementary inner and outer end faces 34, 36, a graphite bottom packing ring 38 having a cross section with a convex V-shaped outer end face 40 and a planar inner end face 42, and a graphite top packing ring 44 having a cross section with a concave V-shaped inner end face 46 and a planar outer end face 48 as better seen in the larger longitudinal cross section of FIG. 2.

The flexible graphite packing rings of the present invention are made from exfoliated graphite particles. Exfoliated graphite is made by treating graphite flakes with an intercalation agent, typically a mixture of sulfuric and nitric acids, and exposing the treated graphite flakes to an elevated temperature, typically in excess of 1000° C. A typical process for making exfoliated graphite is shown in U.S. Pat. No. 3,404,061. These materials and products made from them are available from Polycarbon, Inc., for example.

To make the flexible graphite rings of this invention, the exfoliated graphite particles are compressed into graphite foil sheets having a size at least as large as the diameter of the desired ring. The compressing can be carried out either by passing the exfoliated graphite particles through a series of calender rolls or by compacting the exfoliated graphite in a hydraulic press. Rolling is preferred since it appears to be important to have orientation of the graphite in the plane of the foil as obtained in rolling, for good strength. The compression of the graphite serves to reduce the thickness and raise the density of the precompact sheet to the desired graphite foil properties. It is desirable that the resulting flexible graphite foil have thickness in the range of from 0.2 mm to 2 mm, while the density of the finished foil is in the range of from 0.5 gm/cm$^3$ to 1.5 gm/cm$^3$.

The flexible graphite foil sheets are stacked in layers and configured into a donut shape by cutting a hole through the middle of the sheets and trimming the outer marginal edge to conform to the size of the ring desired. The configured sheets are then laminated and bonded together by compressing the sheets together in the axial direction of the ring. The flexible graphite sheets are introduced into a closed die mold comprising the particularly desired non-planar shape and compressed in the direction of its axis at a pressure in the range of from 100 kg/cm$^2$ to 550 kg/cm$^2$. It is desired that such a compressive force produce a flexible graphite laminate ring having a density in the range of from 1.2 gm/cm$^3$ to 2.3 gm/cm$^3$. Typically, the compression of the sheets in the final pressing to obtain good bonding between adjacent sheets and raise the total density of the material is about ten to one.

The laminated sheets need not be of uniform thickness through the stack. Thus, for example, it may be desirable to have sheets near the top and bottom which are relatively thinner and intermediate sheets which are relatively thicker. In other words, a layer between a bonded interface between sheets and the end of the ring is thinner than a layer between adjacent bonded faces within the body of the ring. The sheets may also be of different densities through the stack to be laminated. Such variations in thickness and density may provide better formability and properties of the ring.

Each flexible graphite sealing ring produced in this manner comprises a chevron-shaped cross section having a convex circumferential ridge located on the outer end face of the ring, a complementary V-shaped groove located on the inner end face of the ring, and cylindrical inside and outside surfaces. The outer end face of the sealing ring comprises two cones, one converging and the other diverging, descending from the apex of the chevron at an approximately 90° included angle from one another.

The inner concave face of the ring comprises a circumferential V-shaped groove approximately complementary to the convex face and having an included angle of approximately 70°. The dissimilarity between the included angle of the outer and inner end faces assures a space between the outer end face of one sealing ring and the inner end face of an adjacent ring upon stacking the sealing rings face to face with each other in the stuffing box. The nadir of the groove in the concave face of the sealing ring has a small radius, e.g. about 1.5 mm., for minimizing stress concentrations.

The top graphite packing ring used in the stuffing box has a planar outer end face, an inner end face having a circumferential V-shaped groove, and cylindrical inside and outside surfaces. The V-shaped groove has an included angle of approximately 70° and intersects the inside and outside surfaces of the ring, being deeper in the middle of the ring cross section.

The graphite bottom packing ring produced in this manner comprises a outer end face having a convex circumferential ridge similar to the ridge around the pressure packing rings, a planar inner end face, and cylindrical inside and outside surfaces. The circumferential ridge has an included angle of approximately 90°. The two end rings of the stack may be formed from die formed braided graphite packing material in a similar geometry.

The flexible graphite rings have an inside diameter approximately equal to the diameter of the shaft and an outside diameter approximately equal to the inside diameter of the stuffing box housing. An exemplary embodiment of the non-planar flexible graphite sealing rings has an inside diameter of approximately 3.5 cm, an outside diameter of approximately 6 cm, and a height of approximately 1.3 cm.

A flexible graphite ring produced in this manner comprises sheets of an anisotropic graphite structure having planes of lamination bonding transverse to its axis and transverse to the axis of the shaft. In a chevron ring, the bonding faces of successive layers are in chevron shapes themselves, approximately parallel or complementary to the end faces of the ring. A structure having planes of bonding transverse to the direction of a compressive force has greater strength, preventing longitudinal splitting and is capable of elastic deformation and lateral spreading for forming an interference fit around a shaft and within a stuffing box to form a fluid tight seal. In addition, with the faces of bonding transverse to the direction of the shaft, possible leakage through the length of the packing is effectively prevented. Bonding faces parallel to the shaft in a sealing ring made from coiled graphite provide a possible leakage path.

Non-planar flexible graphite rings made from circumferentially wound graphite ribbon have their planes of lamination parallel to the shaft axis. Such rings are subject to longitudinal fissure under compression. The spiral rings split longitudinally at the apex of the chevron.

The flexible graphite non-planar sealing rings are used to control leakage in a fluid handling device by first inserting the graphite bottom end ring over the shaft and sliding it inside the stuffing box oriented such that the planar inner end face of the end ring 50 lies flatly against the inner face of the stuffing box 42 and the circumferential convex ridge of the end ring 50 is directed upwards toward the open outer end of the stuffing box. Next, a flexible graphite sealing ring is inserted over the shaft and slid inside the stuffing box oriented such that the V-shaped groove or other non-planar inner end face of the ring is directed downwardly and rests against the outer end face of the bottom ring which has an approximately complementary circumferential convex ridge.

A plurality of identical flexible graphite sealing rings are then inserted over the shaft and slid inside the stuffing box oriented such that the V-shaped groove of the inner end face of each ring is directed downwardly (inwardly toward the pressure within the packing) and rests against the approximately complementary convex ridge of the outer end face of each adjoining sealing ring. Finally, the graphite top end ring is inserted over the shaft and slid inside the stuffing box. The top end ring is oriented such that its V-shaped interior end face is directed against the approximately complementary convex ridge of outer end face of the last pressure packing ring 32. The planar outer end face of the top end ring is directed towards the outside open end of the stuffing box.

After all of the graphite packing rings are inserted into the stuffing box the packing gland 11 is inserted over the shaft and placed against the planar outer end face of the graphite top end ring. The packing gland is then bolted to the top of the bonnet 18 and tightened. This tightening draws the packing gland toward the body of the valve and imposes a compressive force upon all of the graphite packing rings. This compression forces the V-shaped groove of the inner end face of each ring against the convex ridge of the outer end face of each adjoining ring.

Since the convex ridge of each outer end face has an included angle greater than that of the V-shaped groove of each adjoining outer end face the effect of such compression causes the V-shaped groove to flare and expand in a direction transverse to its axis. This expansion forces the inside surface of the sealing ring against the shaft and forces the outside surface of the sealing ring against the interior wall of the stuffing box, thus sealing the device through an interference fit. Accordingly, further tightening of the packing gland increases the compressive force upon the sealing rings, which results in a greater interference fit and a better seal. Additionally, due to the geometry of the seal, increases in internal pressure increase the effectiveness of sealing.

Figure 3:
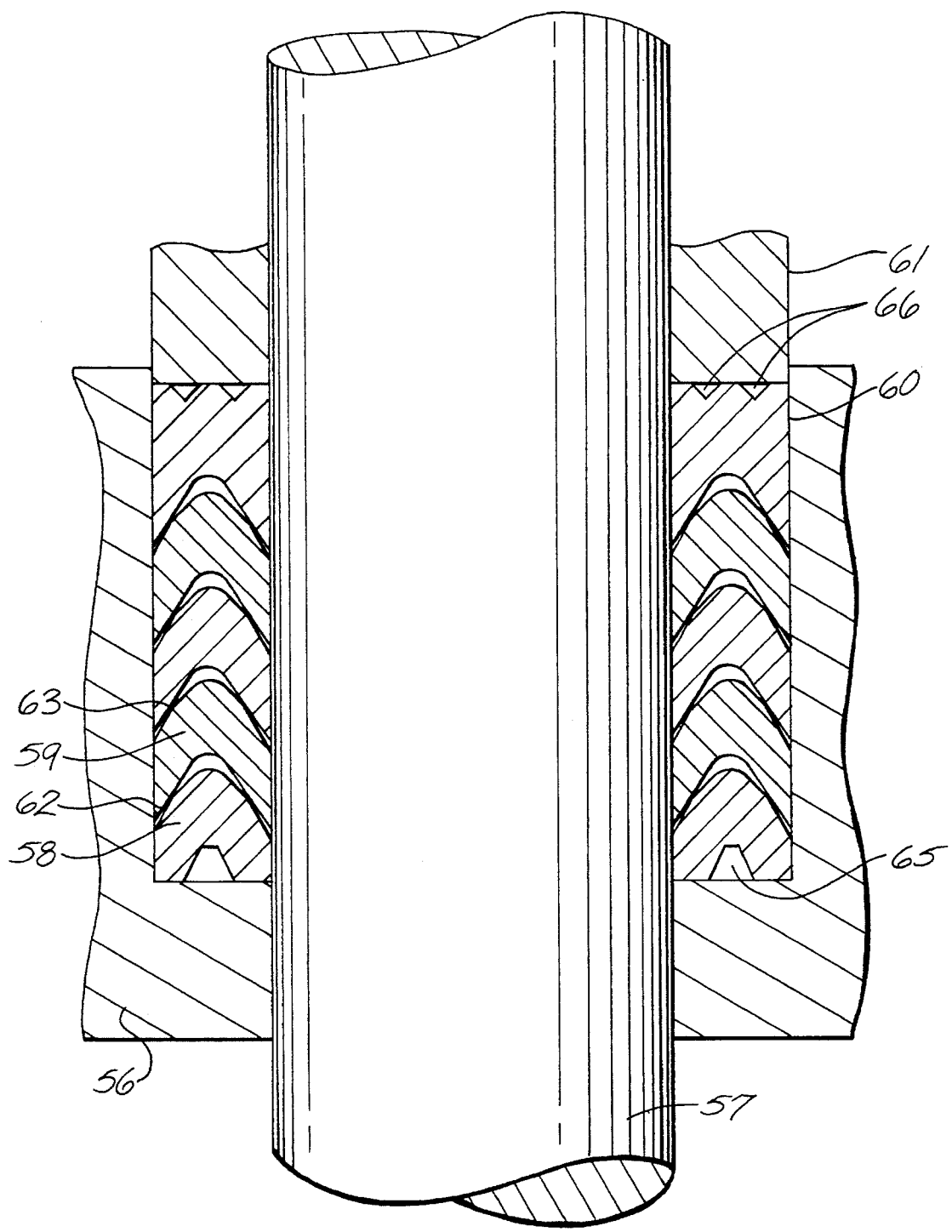
FIG. 3 is a cross section of a stuffing box housing, shaft, non-planar flexible graphite sealing rings and end rings provided in practice of this invention.

FIG. 3 illustrates another embodiment of packing rings for use in practice of this invention. In this embodiment, there is a stuffing box 56 around a shaft 57. An inner or bottom end packing ring 58 fits into the bottom of the stuffing box nearer the high pressure side of the seal. Three chevron-shaped sealing rings 59 are stacked on top of the bottom end ring, with the concave face of each sealing ring facing toward the higher pressure side of the seal. Finally, a top end ring 60 is placed in the stuffing box outside of the three chevron sealing rings. A packing gland 61 completes the assembly in the stuffing box, as described above.

The individual sealing rings 59 differ slightly but significantly from the sealing rings hereinabove described and illustrated in FIG. 2. Each of the sealing rings has a chevron cross section with a crown on the outer or upper convex face and circumferential groove in the inner or lower concave face. This V-shaped groove has an included angle of 70°. There is an included angle of 90° near the apex of the ring on the convex face of each sealing ring. In a lower portion 62 of the convex face near the inner and outer diameters of the ring, the face becomes steeper. The angle of this portion relative to the inner or outer circumferential faces, respectively, is 30°. Thus, the included angle between the two steeper portions 62 nearer the inner and outer diameters of the ring is 60°.

As a consequence of this change of slope, the convex face of a ring engages the concave face of the adjacent ring at a point 63 which is short distance away from the intersection between the concave face and the inner or outer circumferential surface, respectively.

More significantly, it has been found that the relief between the concave face and the surrounding stuffing box makes a large difference in the axial compressibility of the stack of rings. This results not only in a lower gland pressure, but also enhanced sealing. It is believed that when there is no clearance at the lip between the concave face and the cylindrical outside surface of the ring, the lip tends to wedge into the space between the convex face and the stuffing box, thereby resisting axial compression. The second, steeper angle on the convex face provides clearance for lip.

The specific angles mentioned are only exemplary. What is significant is that the included angle near the apex of the convex face is greater than the included angle of the concave face, and the included angle of the portions 62 of the convex face nearer the inner and outer diameters of the ring is less than the included angle of the concave face. Such a geometry moves the point of contact between the rings away from the narrow edge of the ring. It will be apparent that changing the width of the steeper portion changes the location of contact between the rings. Typically, the steeper portion is about one third to one half of the total height of the convex face.

A similar effect can be obtained with variations in the shape of the convex face which provide the clearance mentioned above. For example, the convex face may be formed with a radius instead of two cones. In such an embodiment, the concave face is tangent to the convex face at an elevation away from the edge of the lip.

A part of the desirable effect may be achieved by making the lip at the edges of the concave face somewhat shorter and blunt. The lip is, however, the sealing surface, and some of the benefit of lower gland pressure may be diminished because the lip is stiffer. Similarly, instead of having a concave face with a uniform included angle and a convex face with a non-uniform included angle, those could be reversed for moving the contact between the convex and concave faces away from the lip.

Such a geometry of chevron shaped sealing ring is beneficial in a ring made of sealing materials other than flexible graphite, such as, for example, tetrafluoroethylene, polytetrafluoroethylene, polyetheretherketone or the like.

The bottom end ring 58 also has two different included angles on the convex face for engaging the concave face of the lowest sealing ring in the stuffing box in the same manner that adjacent sealing rings engage each other. The opposite end face of the bottom end ring adjacent to the bottom of the stuffing box is flat over a substantial portion of its area for bearing against the bottom of the stuffing box. A generally V-shaped circumferential groove 65 extends around the ring with the nadir of the groove being aligned with the apex of the convex face. The nadir of the groove is flat-bottomed instead of sharp for minimizing stress concentrations.

It is desirable to make the bottom end ring by pressing sheets of exfoliated graphite with the bonding faces transverse to the axis of the shaft. The circumferential groove opposite the apex of the convex face makes the "thickness" of the ring from face to face more similar and makes the pressed density of the ring more uniform. This gives stronger bonding between the adjacent sheets, particularly near the middle of the cross section, and minimizes the likelihood of breakage of the bottom end ring.

A similar stratagem is used for improving the properties of the top end ring 60 in the stuffing box. Instead of having a generally V-shape as in the bottom end ring, the top end ring has a generally W-shaped cross section. The concave face of the top end ring is similar to the concave face of each of the sealing rings 59. The principal portion of the opposite or outer face of the top end ring adjacent to the packing gland 61 is flat. There are, however, two circumferential grooves 66 in this face extending around the ring. Each of these grooves is offset to one side of the nadir of the concave face of the top end ring. That is, one of the grooves has a diameter larger than the diameter of the nadir of the concave face and the other groove has a diameter smaller than the diameter of the nadir. It will be apparent that these additional circumferential grooves opposite thicker portions of the top end ring make the density of the top end ring more uniform, particularly near the more critical nadir of the concave face.

The strengthening effect of grooves in the otherwise planar end face of each end ring is also due to shear flow of the flexible graphite during consolidation as the ring is formed in a die. The grooves cause lateral flow of the flexible graphite and better bonding between adjacent sheets and within the sheets themselves.

In addition, the grooves 65, 66 reduce the area of the end ring in contact with the stuffing box 56 and packing gland, 61 respectively. This increases the sealing pressure at the ends and enhances the seal obtained by the packing. This shear flow of flexible graphite does not occur in rectangular cross section sealing rings. Thus, the specific geometry and location of the grooves may be varied from the specific placement illustrated.

It will be apparent that such embodiments of top and bottom end rings with grooves in the flat faces may be used with the embodiment of sealing rings in FIG. 2 as well as the embodiment of FIG. 3.

Thus, an embodiment as illustrated in FIG. 3 has several advantages over an embodiment as illustrated in FIG. 2. These result in lower gland pressures for lower shaft friction forces, and a better fluid seal.

Flexible graphite seal rings as described can provide excellent sealing to elevated temperatures, much higher than the 260° C. limit of Teflon. When protected from oxidation, flexible graphite seals may be used to temperatures over 800° C. Even when exposed to oxidizing environment they may be used at temperatures near 550° C. The seal is compliant and self energizing under relatively low compressive forces. For example, to obtain sealing with flat graphite sealing rings, pressures of about 400 kg/cm$^2$ are needed to effect a good seal. A pressure of only about 110 kg/cm$^2$ is needed for a very tight seal with a flexible graphite chevron seal as provided in practice of this invention.

This is not a trivial difference. The lower compression stress means that a much smaller valve operating motor or gear may be used as compared with a prior flat seal. The friction on the shaft due to the seal is much smaller, typically about one third as much as with rectangular cross section seal rings. The valve operator may be as much as one third of the cost of a large valve and cost savings can be significant.

In the exemplary embodiments, only three sealing rings and a pair of mating end rings are used in a valve seal. Larger numbers of seal rings may be used for redundancy. Three rings has been shown to be adequate in a volatile organics fugitive emissions test. In such a test three rings retained methane at a pressure of about 31 kg/cm$^2$ (300 psi) with no detectable leakage. As can be readily realized, such a tight seal is quite significant when toxic materials are being handled. Furthermore, because of its high temperature resistance, such a seal can be relied on to maintain its integrity in fire situations where lower temperature materials might fail.

It might also be noted that the rings may be diagonally split at one side so that they may be placed around a shaft by twisting the ring open rather than placed over the end of the shaft. This is needed at times since it may not be possible to completely disassemble structure from the end of the shaft for replacing the seal rings. Such a split ring may be used since the sealing is at the lip of the chevron and multiple rings in the seal minimize potential leakage paths.

Figure 4:
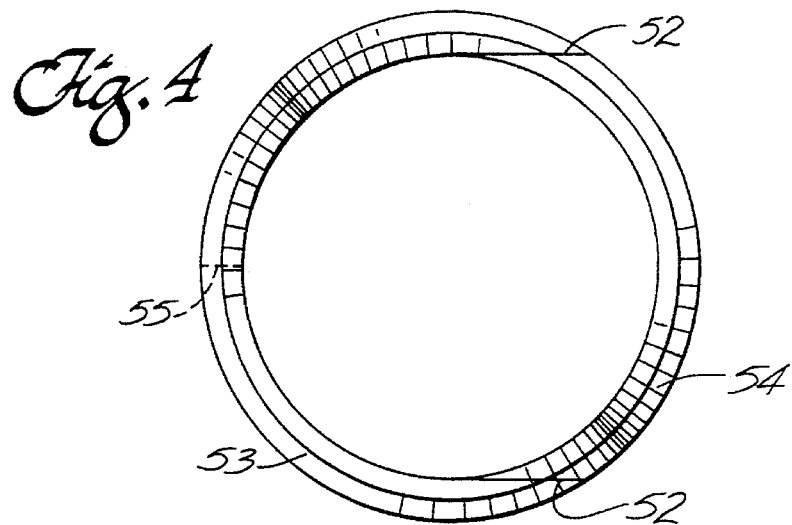
FIG. 4 is a face view of a ring illustrating how a ring may be made in multiple parts.

Similarly, a sealing ring may be made in two or more parts for fitting laterally onto a shaft instead of fitting over the end. For example, the ring may be split into two semicircles. FIG. 4 illustrates the face of a sealing ring with a pair of slits 52 tangent to the inside diameter of the ring. The ring is thus divided into a horseshoe shaped piece 53 and a arcuate segment 54. The arcuate segment may be removed for fitting the horseshoe shaped piece around a shaft and then the segment is replaced before the ring is pressed into the stuffing box. If desired, another slit 55 may be used for subdividing the horseshoe shaped piece.

The flexible graphite used for forming the seal rings may not be pure exfoliated graphite. It is sometimes desirable to introduce corrosion inhibitors in the graphite, such as zinc, barium molybdate or various proprietary phosphate inhibitors. Such corrosion inhibitors may be commingled with the graphite particles used for forming the sheets, or may be provided on the surfaces of the completed rings.

Figure 5:
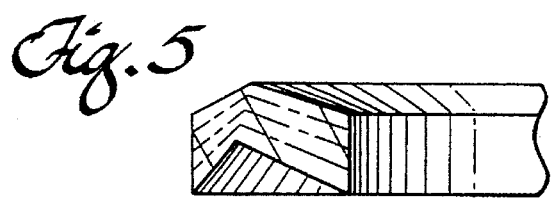
FIG. 5 is a fragmentary cross section of an asymmetrical embodiment of non-planar ring configuration.

Although but only two exemplary embodiments of non-planar flexible graphite sealing rings for sealing the shaft of a fluid handling device have been described in detail above, many variations will be apparent to those skilled in the art. For example, FIG. 5 illustrates a flexible graphite sealing ring comprising an alternative non-planer cross section which is chevron shaped, but asymmetrical. The portion of the chevron between the apex and the inner diameter of the ring is relatively narrower, and the portion of the chevron between the apex and the outer diameter of the ring is relatively wider. This may also change the angles of the concave and convex faces, thereby changing the proportions of the forces directed toward the shaft and toward the stuffing box, respectively.

Figure 6:
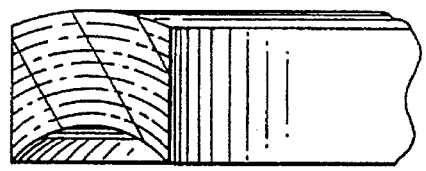
FIG. 6 is a cross section of an alternative non-planar ring configuration.

FIG. 6 illustrates another flexible graphite sealing ring with a non-planar cross section having approximately complementary curved inner and outer end faces. In this embodiment the cross section comprises a convex outer end face having a larger radius than that of the ring's concave inner end face. When subjected to a compression force the interaction of the inner and outer end faces of adjacent rings causes an enhanced interference fit, forming a seal in much the same manner as the chevron cross-section of the exemplary embodiments.

Figure 7:
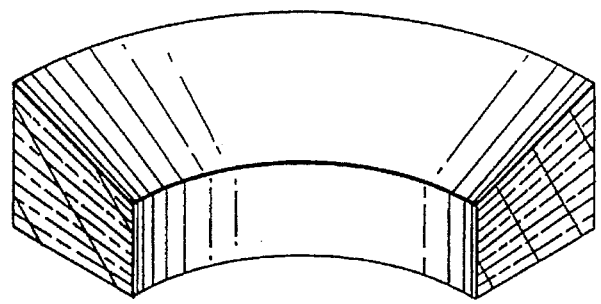
FIG. 7 is a cross section of another embodiment of non-planar ring configuration.

FIG. 7 illustrates a flexible graphite sealing ring comprising an alternative cross section having approximately complementary non-planar inner and outer end faces. In this embodiment the cross section comprises a conical outer end face that descends from the outside surface towards the inside surface. The conical inner end face descends from the outside surface toward the inside surface in an approximately complementary fashion. The outer end face descends from the outside surface at a greater angle than that of the inner end face. The cross section of the ring is, therefore, somewhat wedge shaped. When subjected to a compression force, the interaction between adjoining inner and outer end faces causes the inside surface adjacent to the outer end face to be forced against the shaft and outside surface near the inner end face to be forced against the interior wall of the stuffing box, thus generating an enhanced interference fit and providing the necessary seal. Another pair of rings with opposite wedging action may be used for sealing against the wall of the stuffing box.

The rings hereinabove described and illustrated have cylindrical inside and outside surfaces complementary to the surfaces of the shaft and stuffing box, respectively. If desired, a small taper may be provided on the inside and/or outside surfaces. This can bring the thinner lip of each ring into close engagement with the corresponding sealing surface without having an unduly tight fit for the outer portion of the ring nearer the apex of the convex face. Such an arrangement may provide a good seal with lower operating friction of the shaft.

Since many such modifications may be made, it is to be understood that within the scope of the following claims, this invention may be practiced otherwise than specifically described.

What is claimed is:

1. A shaft seal comprising:

a shaft;

a stuffing box around the shaft;

a packing between the shaft and stuffing box comprising a plurality of sealing rings each having approximately complementary non-planar end faces;

a first end ring engaging one end of the plurality of sealing rings, the first end ring having a non-planar face approximately complementary to the non-planar face on the adjacent sealing ring, and an opposite end face with a flat bearing surface and at least one concave circumferential groove in the flat surface; and a second end ring for the other end of the plurality of sealing rings, the second end ring having a non-planar face approximately complementary to the other non-planar face on an adjacent sealing ring, and an opposite end face with a flat bearing surface and at least one concave circumferential groove in the flat surface.

2. A shaft seal comprising:

a shaft;

a stuffing box around the shaft;

packing between the shaft and stuffing box comprising a plurality of sealing rings each having a generally chevron shaped cross section having approximately complementary concave and convex non-planar end faces;

a first end ring engaging one end of the plurality of sealing rings, the first end ring having a non-planar face approximately complementary to the non-planar face on the adjacent sealing ring, and an opposite end face with a flat bearing surface and at least one concave circumferential groove in the flat surface; and second end ring which has a concave face similar to a concave face on a sealing ring and engaging the convex face on an adjacent sealing ring, and an opposite end face with two concave circumferential grooves in the flat surface.

3. A shaft seal as recited in claim 2 wherein the first end ring has a convex face similar to a convex face on a sealing ring and engaging the concave face on an adjacent sealing ring, and a central concave circumferential groove in the flat surface opposite the center of the convex face.

4. A shaft seal as recited in claim 3 wherein each end ring is formed substantially entirely of axially compressed exfoliated graphite having bonded faces transverse to the axis of the shaft.

5. A shaft seal as recited in claim 1 wherein the end ring is formed substantially entirely of axially compressed exfoliated graphite having bonded faces transverse to the axis of the shaft.

6. A shaft seal as recited in claim 1 wherein such a sealing ring has a generally chevron shaped cross section having approximately complementary concave and convex end faces, wherein the shape of the convex face differs from the shape of the concave face so that contact between such a convex face on one ring and a concave face on an adjacent ring is at a location on the concave face spaced apart from an intersection of the concave face and the inside and outside circumferences of the ring, respectively.

7. A shaft seal as recited in claim 2 wherein such a sealing ring has a generally chevron shaped cross section having approximately complementary concave and convex end faces and the chevron is asymmetrical, the distance between the peak of the chevron and the inside diameter of the ring being less than the distance between the peak of the chevron and the outside diameter of the ring.

8. A shaft seal as recited in claim 2 wherein such a sealing ring has a generally chevron shaped cross section having approximately complementary concave and convex end faces wherein the convex face has a relatively larger included angle nearer the center of the chevron and a relatively smaller included angle nearer each edge of the chevron, and the concave face has a substantially uniform included angle.

9. A shaft seal as recited in claim 1 wherein the non-planar sealing ring comprises a cross section having approximately complementary curved or toroidal shaped inner and outer end faces.

10. A shaft seal comprising:
a shaft;
a stuffing box around the shaft;
a packing between the shaft and stuffing box comprising a plurality of sealing rings each having a generally chevron shaped cross section having approximately complementary concave and convex non-planar end faces;
a first end ring for one end of a stack of sealing rings, the first end ring having a convex face similar to a convex face on a sealing ring, and an opposite end face with a flat bearing surface and a concave circumferential groove in the flat surface; and further comprising
a second end ring for the other end of a stack of sealing rings, the second end ring having a concave face similar to a concave face on a sealing ring, and an opposite end face with a flat bearing surface and two concave circumferential grooves in the flat surface.

11. A valve comprising:
a valve body including a fluid flow passage through the valve;
means for closing the fluid flow passage;
a shaft for actuating the means for closing the fluid flow passage; and
a shaft seal between the shaft and valve body, the seal comprising:
a stuffing box around the shaft;
a packing between the shaft and stuffing box comprising plurality of sealing rings each having a generally chevron shaped cross section having approximately complementary concave and convex non-planar end faces;
a first end ring for one end of a stack of sealing rings, the first end ring having a convex face similar to a convex face on a sealing ring, and an opposite end face with a flat bearing surface and a concave circumferential groove in the flat surface; and further comprising
a second end ring for the other end of a stack of sealing rings, the second end ring having a concave face similar to a concave face on a sealing ring, and an opposite end face with a flat bearing surface and two concave circumferential grooves in the flat surface.

12. A shaft seal as recited in claim 10 wherein the end rings are each formed substantially entirely of axially compressed exfoliated graphite having bonded faces transverse to the axis of the shaft.

13. A valve comprising:
a valve body including a fluid flow passage through the valve;
means for closing the fluid flow passage;
a shaft for actuating the means for closing the fluid flow passage; and
a shaft seal between the shaft and valve body, the seal comprising:
a stuffing box around the shaft;
a packing between the shaft and stuffing box comprising a plurality of sealing rings each having approximately complementary non-planar end faces;
a first end ring engaging one end of the plurality of sealing rings, the first end ring having a non-planar face approximately complementary to the non-planar face on the adjacent sealing ring, and an opposite end face with a flat bearing surface and at least one concave circumferential groove in the flat surface; and
a second end ring for the other end of the plurality of sealing rings, the second end ring having a non-planar face approximately complementary to the other non-planar face on the adjacent sealing ring, and an opposite end face with a flat bearing surface and at least one concave circumferential groove in the flat surface.

14. A shaft seal comprising:
a shaft;
a stuffing box around the shaft;
a packing between the shaft and stuffing box comprising a plurality of sealing rings each having a generally chevron shaped cross section having approximately complementary concave and convex end faces;
a first end ring engaging one end of the plurality of sealing rings, the first end ring having a convex face similar to a convex face on a sealing ring, and an opposite end face with a flat bearing surface and a concave circumferential groove in the flat surface; and
a second end ring engaging the other end of the plurality of sealing rings, the second end ring having a concave face similar to a concave face on a sealing ring, and an opposite end face with a flat bearing surface and two concave circumferential grooves in the flat surface.

15. A shaft seal as recited in claim 14 wherein the sealing rings and the end rings are each formed substantially entirely of axially compressed exfoliated graphite having bonded faces transverse to the axis of the shaft.

16. A shaft seal as recited in claim 15 wherein the shape of the convex face on such a sealing ring differs from the shape of the concave face so that contact between such a convex face on one ring and a concave face on an adjacent ring is at a location on the concave face spaced apart from the intersection of the concave face and the inside and outside circumferences of the ring, respectively.

17. A shaft seal as recited in claim 15 wherein the chevron of such a sealing ring is asymmetrical, being relatively narrower near the shaft and relatively wider further from the shaft.

18. A shaft seal as recited in claim 15 wherein the convex face of such a sealing ring has a relatively larger included angle nearer the center of the chevron and a relatively smaller included angle nearer each edge of the chevron, and the concave face has a substantially uniform included angle.

19. A shaft seal comprising:

a shaft;

a stuffing box around the shaft;

a packing between the shaft and stuffing box comprising a plurality of sealing rings each having a generally chevron shaped cross section having approximately complementary concave and convex end faces;

a first end ring engaging one end of the plurality of sealing rings, the first end ring having a concave end face engaging a convex face on a sealing ring, the first end ring having a W-shaped cross section with a flat bearing surface opposite to its concave end face; and a second end ring engaging the other end of the plurality of sealing rings, the second end ring having a convex end face engaging a concave face on a sealing ring, the second end ring having a V-shaped cross section with a flat bearing surface opposite to its convex end face; and wherein the sealing rings and the end rings are each formed substantially entirely of axially compressed exfoliated graphite having bonded faces transverse to the axis of the shaft.

* * * * *